(12) United States Patent
Pierce et al.

(10) Patent No.: US 7,660,920 B2
(45) Date of Patent: Feb. 9, 2010

(54) MULTI-RATE OPTIMIZED CONNECTION BETWEEN INDUSTRIAL CONTROL SCANNER AND INDUSTRIAL CONTROLLER

(75) Inventors: Scott A. Pierce, Concord Township, OH (US); Anthony J. Cachat, Chagrin Falls, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 156 days.

(21) Appl. No.: 11/528,202

(22) Filed: Sep. 27, 2006

(65) Prior Publication Data
US 2007/0076267 A1    Apr. 5, 2007

Related U.S. Application Data

(63) Continuation-in-part of application No. 11/239,947, filed on Sep. 30, 2005.

(51) Int. Cl.
G06F 3/00 (2006.01)
G06F 5/00 (2006.01)
G06F 11/00 (2006.01)
G06F 15/16 (2006.01)

(52) U.S. Cl. .............. 710/52; 710/36; 710/61; 710/60; 714/4; 709/201

(58) Field of Classification Search .......... 710/61, 710/52, 36, 60; 714/4; 709/201
See application file for complete search history.

(56) References Cited

U.S. PATENT DOCUMENTS

| | | | |
|---|---|---|---|
| 4,172,289 A | 10/1979 | Struger et al. | |
| 5,307,463 A * | 4/1994 | Hyatt et al. | 710/1 |
| 5,844,794 A | 12/1998 | Keeley | |
| 6,088,624 A * | 7/2000 | Khan et al. | 700/86 |
| 6,269,414 B1 * | 7/2001 | Engdahl | 710/300 |
| 6,535,926 B1 * | 3/2003 | Esker | 709/248 |
| 7,191,271 B2 * | 3/2007 | Andre | 710/119 |
| 2004/0205111 A1 | 10/2004 | Chamsmawala et al. | |
| 2007/0005248 A1 * | 1/2007 | Averill et al. | 701/301 |

FOREIGN PATENT DOCUMENTS

WO    WO 2005/050894    6/2005

OTHER PUBLICATIONS

European Search Report for EP App. No. 07114915.7-2206, dated Dec. 21, 2007, European Patent Office, Munich Germany.

(Continued)

Primary Examiner—Alford W Kindred
Assistant Examiner—Farley J Abad
(74) Attorney, Agent, or Firm—Boyle Fredrickson LLP; R. Scott Speroff

(57) ABSTRACT

An industrial controller may communicate with a number of input/output (I/O) modules using an optimized connection packet assembled by a scanner communicating directly with the I/O modules and forwarding the optimized connection packet to the industrial processor. The optimized connection packet is communicated over a connection as part of a connected messaging system used to ensure highly reliable network communication. The need for higher data rates for some I/O modules as part of the optimized connection packet may be accommodated through the opening of a second redundant connection that provides the high-data-rate data in an interleaving fashion with the optimized connection packet, without upsetting the optimized connection packet or changing the use of the data by the industrial control program.

16 Claims, 5 Drawing Sheets

OTHER PUBLICATIONS

Schiffer, Viktor, The CIP Family of Fieldbus Protocols and its newest Member—Ethernet/IP, Emerging Technologies and Factory Automation, 2001. Proceedings. 2001 8th IEEE International Conference on Oct. 15-18, 2001, pp. 377-384, IEEE, Piscataway, NJ, US.

* cited by examiner

MULTI-RATE OPTIMIZED CONNECTION BETWEEN INDUSTRIAL CONTROL SCANNER AND INDUSTRIAL CONTROLLER

CROSS REFERENCE TO RELATED APPLICATION

This application is a continuation-in-part of U.S. application Ser. No. 11/239,947, filed Sep. 30, 2005, hereby incorporated by reference.

STATEMENT REGARDING FEDERALLY SPONSORED RESEARCH OR DEVELOPMENT

BACKGROUND OF THE INVENTION

The present invention relates generally to industrial control systems and more particularly, to a method and apparatus for transmitting industrial control data in such systems.

Industrial controllers are special purpose computers used for controlling industrial processes or manufacturing equipment. Under the direction of a stored program, the industrial controller examines a series of inputs reflecting the status of the controlled process and changes outputs effecting the control of the process. The inputs and outputs may be binary (i.e., "on" or "off") or alternatively analog inputs and outputs taking on a continuous range of values may also be used. The binary inputs and outputs may be represented by single bits of data; the analog inputs and outputs may be represented by multiple bit data words.

The various components of an industrial controller are often spatially distributed about a factory or manufacturing facility to be interconnected by one or more communication networks. These communication networks are characterized by being highly reliable and by delivering data with a minimal and well-defined delay, as are required for real-time control. A number of different communication networks are commonly used in the industrial controller art including but not limited to: ControlNet™, DeviceNet™, and EtherNet/IP™ whose specifications are published and whose protocols are used broadly by a number of manufacturers and suppliers. These communication networks differ from one another in physical aspects, for example, the type of media (e.g., co-axial cable, twisted pair, light fiber, etc.); the protocols of its operation (e.g., baud rate, number of channels, word transmission size, use of connected messaging, etc.); and how the data is formatted and how it is collected into standard messages.

A common component of the industrial control system is an input or output (I/O) module which accepts data for an industrial controller from the controlled process or machine, and provides data from the industrial controller to the controlled process or machine. I/O modules are typically remote from the industrial controller and connected via a communications network as described above.

The various I/O modules employed in an industrial control system may generate data at differing intervals and frequencies. If the controller were to interface with the I/O modules asynchronously as each generated its data, the control system would encounter difficulties in synchronizing its control actions, and network traffic may become cumbersome. For instance, a controller may not require data from a particular I/O module at the same frequency as the module generates data. If the I/O module were to send a transaction to the controller each time it updated its data, the controller would be required to process transactions for data it did not need for its current control decision.

To optimize network traffic, translate and proxy between differing network types, and generate a synchronous data transfer frame, a scanner may be used as a physical or logical intermediary between the I/O modules and the controller. The scanner may interface with the I/O modules to collect data at predetermined update intervals, consolidate the data into a single optimized connection packet, and transfer the optimized connection packet to the controller using a single transaction per update interval. Hence, the controller receives data at a controlled and predetermined interval, presumably when it needs the data for control decision purposes.

The optimized connection packet is normally transmitted by a "connected messaging" protocol. As is understood in the art, connected messaging establishes a logical connection between two devices on a network (e.g. the controller and the scanner) which pre-allocates network bandwidth and buffer space, and other resources at the devices to ensure predictable and timely transmission of the data. This may be contrasted to unconnected messaging systems where changes in network traffic can unpredictably affect the communication of messages.

Upon generating the optimized connection packet, the scanner periodically sends the optimized connection packet to the controller over a pre-established connection. An optimized connection packet is a block of unstructured data representing the data collected from each of the I/O modules. The data from each module is concatenated in a predetermined order without formatting. The construct of the optimized connection packet is determined in advance. This predetermined construct is used by the controller application and the program development system (i.e., used to develop the controller application) when referencing data within the optimized connection packet. For example, if the output of a particular I/O module resides at bits N-K of the optimized connection packet, the program instructions in the controller application reference exactly these bits for use in the generation of a control decision.

In developing a control application, the application developer must know the mapping of the optimized connection packet. The fixed references to parts of the optimized connection packet are included in the program commands that make up the control application. If the mapping of the optimized connection packet changes, due to the addition or deletion of an I/O module, a change in the order of the I/O modules serviced by the scanner, etc., the fixed references must be updated in the control application so that the controller references the appropriate data.

As described in the parent application to the present case, references by a programmer to data of the optimized connection packet can be made easier through use of cast tags in which tag structures are used to translate from physical locations in the optimized connection packet to convenient variable names that may be incorporated into the program without reference to actual physical locations.

Combining all I/O data into a single optimized connection packet provides for extremely efficient communication of the I/O data, but it also forces a single rate of data delivery for all I/O data. Often it may be necessary to transmit some I/O data, for example, data that changes rapidly or is used to synchronize a high-speed process, at a much higher rate than the remaining I/O data. While the transmission rate of the optimized connection packet may be increased to match the desired data rate for this high-speed I/O data, this approach may be impractical with the available network bandwidth, and at least, wastes considerable bandwidth by transmitting all I/O data at an unnecessarily high rate.

If the need for a higher data rate for some data is discovered after programming is complete, moving this data from the optimized connection packet, disrupts the structure of this optimized connection packet and requires considerable programming effort.

SUMMARY OF THE INVENTION

The present invention provides a method of increasing the data communication rate of a given I/O data without reprogramming the optimized connection packet and without disrupting existing programs that use the I/O data or creating multiple versions of the same data that require synchronization. Generally, the invention provides a second augmenting connection between the scanner and the industrial controller that provides data interleaved with the data transmitted by the optimized connection packet. Importantly, the second connection uses the same buffer locations in the scanner and the industrial controller as used by the optimized connection packet, eliminating the fragmentation of data that creates reference and synchronization problems. The second connection transmits only a subset of the data, so is extremely efficient in bandwidth.

Specifically then, the present invention provides an industrial control system having multiple I/O modules operable to interface with a process to exchange I/O data with the process. In the industrial control system, a scanner exchanges the I/O data with the I/O modules and creates an optimized connection packet including the I/O data for each module arranged in an unformatted data block. The scanner then exchanges the optimized connection packet with the industrial controller in a first connected message at a first rate at first times and exchanges a subset of the optimized connection packet with the scanner at a second rate at second time interleaved with the first times.

It is thus one object of at least one embodiment of the invention, to allow different data elements of a single optimized connection packet to be communicated at different rates. It is another object to permit the data rate of given data elements to be changed after the fact without reprogramming the optimized connection packet or the programs that make use of the given data element.

The subset of data transmitted at the second rate may be defined by the data of one or more given I/O modules.

Thus, it is another object, of at least one embodiment of the invention, to provide a method of tailoring a different data delivery rate to individual I/O modules.

The scanner may communicate with the plurality of I/O modules at a plurality of different times.

It is another object, of at least one embodiment of the invention, to provide for a method that accommodates the asynchronous collection of I/O data normally provided by the scanner.

The second rate may be equal to or greater than the first rate so that the subset is delivered at no less than twice the rate of other data of the optimized connection packet.

It is thus another object, of at least one embodiment of the invention, to provide for increases in the rate of transmission of I/O data and to increase the timeliness of the I/O data by interleaving two connections of lower speed.

The scanner may build the optimized connection packet in a scanner buffer and the first and second connections may use the scanner buffer for corresponding data.

It is another object, of at least one embodiment of the invention, to provide the above benefits without substantially increasing the overall amount of buffer space required in the scanner.

The first and second connections also use the same buffer locations in the industrial control buffer for corresponding data.

It is yet another object, of at least one embodiment of the invention, to avoid generating multiple copies of the data that must be synchronized and further to allow programs using the data to remain unchanged.

These particular objects and advantages may apply to only some embodiments falling within the claims and thus do not define the scope of the invention.

BRIEF DESCRIPTION OF THE DRAWINGS

Figure 1:
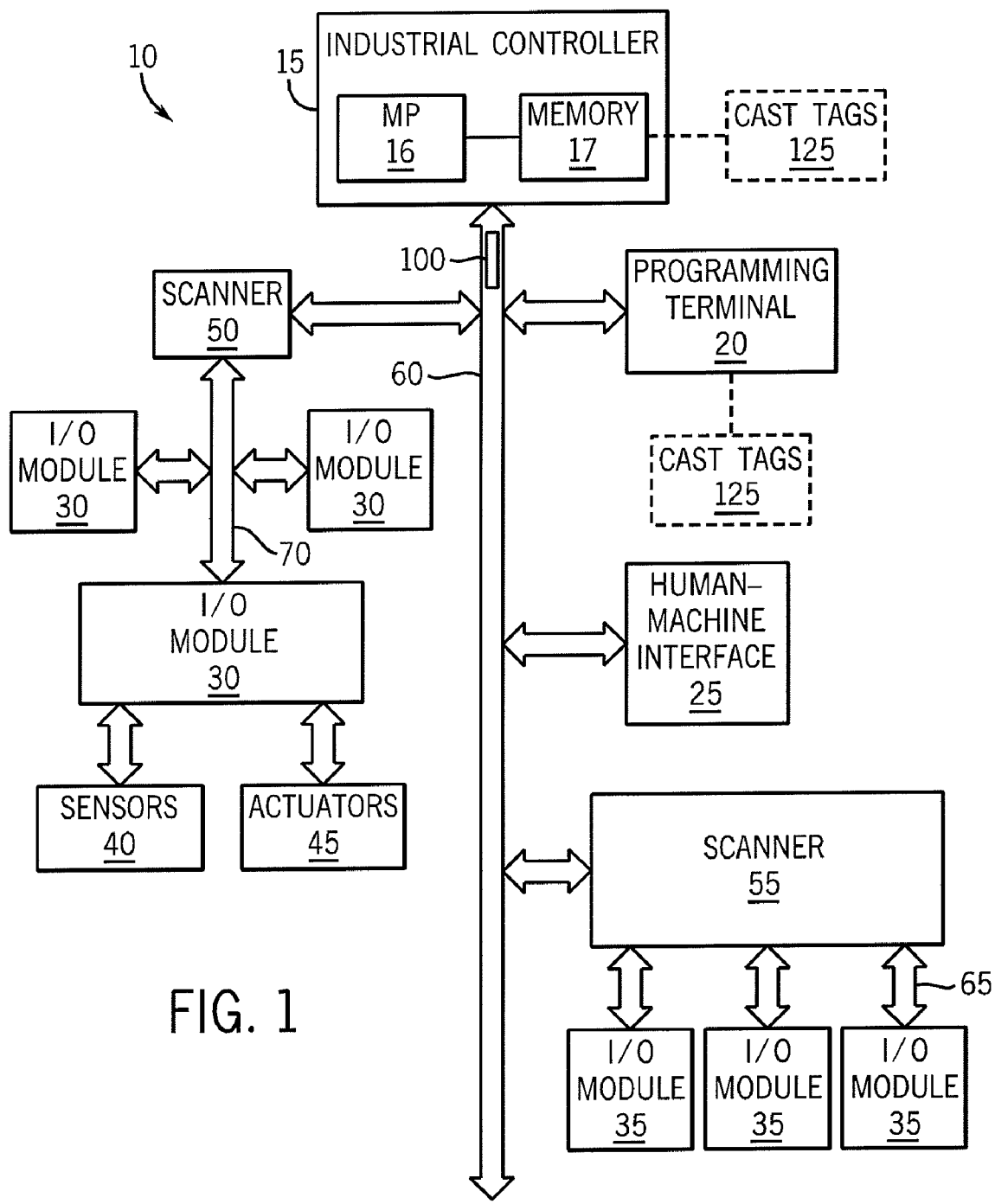
FIG. 1 is a simplified block diagram of an industrial control system in accordance with one illustrative embodiment of the present invention.

Referring now to FIG. 1, the present invention shall be described in the context of an industrial control system 10. Generally, the industrial control system 10 includes an industrial controller 15 (e.g., programmable logic controller (PLC)) including a processing unit 16 and a memory 17, a programming terminal 20, a human-machine interface (HMI) 25, I/O modules 30, 35, sensors 40, actuators 45, scanners 50, 55, and communication networks 60, 65, 70.

The programming terminal 20 allows the configuring, modifying, debugging and maintaining of the industrial control system 10. For instance, the programming terminal 20 may communicate with the industrial controller 15 to modify aspects of the controller's operation, such as the control program stored in the memory 17 and executed by the processing unit 16. The HMI 25 provides an operator interface for operating the industrial control system 10 to perform an automated industrial process.

As will be described in greater detail below, the programming terminal 20 defines cast tags that may be used to superimpose a data structure over the unstructured data sent between the industrial controller 15 and the scanners 50, 55. These cast tags may be employed by the other entities in the industrial control system 10, such as the industrial controller 15 or HMI 25, to logically reference individual subsets of the unstructured data block without requiring previous knowledge of the predetermined structure of the data. Hence, the cast tags may be used to logically reference the data objects maintained by the I/O modules that represent the configuration and state of the I/O module 30, even though those data objects are embedded in an unstructured data block that includes data from multiple modules.

The I/O modules 30, 35 provide interfaces to the sensors 40 and actuators 45 associated with a controlled process. The sensors 40 can sense items such as temperature, pressure, flow rate of a fluid, torque, electrical current, etc. The actuators 45 control items such as motors, valves, etc. associated with robotic systems, fans, beaters, pumps, and the like. For example, one type of actuator 45 is a motor drive operable to generate variable frequency drive signals for driving an associated motor. For ease of illustration, individual sensors 40 and actuators 45 are not illustrated for all of the I/O modules 30, 35.

At the industrial controller 15 the input signals from the I/O modules 30, 35 may be processed under a control program and further signals sent as output signals (i.e., to the actuators 45). The particular process being controlled, and specific input and output module types are not material to the present invention. The I/O modules 30,35 may be integrated with the industrial controller 15 or remote from the industrial controller 15. In one embodiment, the industrial control system 10 may be implemented using Logix™ components offered by Rockwell Automation, Inc. of Milwaukee, Wis.

The communication networks 60, 65, 70 may take the form of cables, and may be discrete wiring, or may comprise a digital network which may also include repeaters, routers, bridges, and gateways. Suitable communication networks 60, 65, 70 are the DeviceNet™, Ethernet/IP™, or ControlNet™ networks also offered by Rockwell Automation.

As seen in FIG. 1, the I/O modules 30 are connected as a network 70 under the scanner 50. The scanner 50 acts as an intermediary between the I/O modules 30 and the industrial controller 15. The scanner 55 also connects to the communication network 60, but its associated I/O modules 35 are coupled underneath the scanner 55 using separate network 65 (or channels on one medium) for communication with the scanner 55.

The scanners 50, 55 may also operate as routers to translate from one communication protocol (e.g., used on the network 60) to another protocol (e.g., used over the network 65 or network 70). The arrangement of the scanners 50, 55 is provided to illustrate different techniques for interfacing the I/O modules within the industrial control system 10. An actual implementation may include only a single scanner 50, 55 employing one of the interface arrangements shown or a different interface arrangement. For ease of illustration, the following discussion references the scanner 50, however, the techniques are equally applicable to either scanner 50, 55.

In the illustrated embodiment, the industrial controller 15 is programmed using an object-oriented programming language. The programming terminal 20 may interface with the industrial controller 15 to modify, add, or delete various objects stored in a memory 17 of the industrial controller 15 and used to implement its functionality. Collectively, the objects maintained in the memory to implement the functionality of the industrial controller 15 may be referred to as the control program of the industrial controller. Hence, the programming terminal 20 provides a programming interface for updating the control program of the industrial controller 15.

Figure 2:
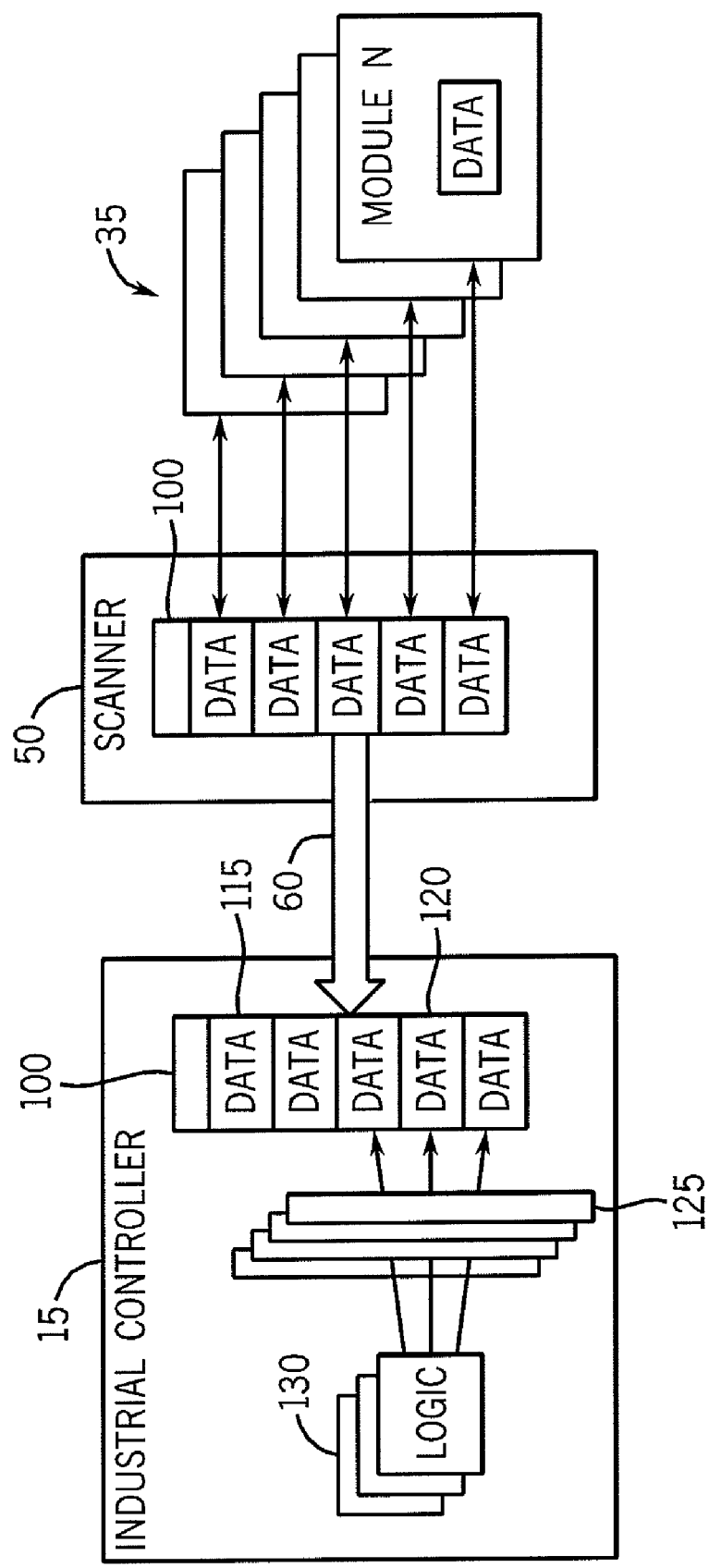
FIG. 2 is a diagram illustrating a single connection between the industrial controller and the scanner for communicating an optimized connection packet.

The scanner 50 interfaces with the I/O modules 30 to collect input data during an update interval, consolidates the data into a single optimized connection packet 100, shown in greater detail in FIG. 2, and transfers the optimized connection packet 100 to the industrial controller 15 in a connection 140. As described above, the connection 140 is opened before communication of data has begun and establishes a schedule for transmission, preallocates network bandwidth, buffers and other network resources as is understood in the art. The particular interval between updates (i.e., optimized connection packets 100) may vary depending on the particular implementation. The scanner 50 also communicates output data from the industrial controller 15 to the I/O modules 30 to change the state of one of the controlled actuators 45 based on the control program's operations on the previous input data.

The scanner 50 may use various techniques for collecting the data from the I/O modules 30. For instance, the scanner 50 may poll the I/O modules 30 periodically and request the most recent data values for each monitored parameter. I/O modules 30 that had not generated new data would respond with their previous data values. Alternatively, an I/O module 30 may set a flag whenever it has generated new data. The scanner 50 may monitor the flag and request data during update intervals only when the flag is set (i.e., with the flag being cleared after the transfer). In yet another alternative technique, the I/O modules 30 may send data to the scanner 50 as it is generated (e.g., synchronously or asynchronously). Although this technique may result in additional traffic between the scanner 50 and the I/O modules 30, that traffic would not affect the industrial controller 15, as it would only receive optimized connection packets 100 at the expected interval. In the case of analog modules (e.g., one of the I/O modules 35), the data may be available continuously to the scanner 55.

Turning now to FIG. 2, a diagram illustrating the interface between the industrial controller 15 and the scanner 50 for communicating an optimized connection packet 100 is shown. The optimized connection packet 100 is a block of unstructured data representing the data collected from each of the I/O modules 35. The data from each I/O module 30 is concatenated in a predetermined order without formatting.

In one illustrative example, two of the I/O modules 35, referred to as Module 1 and Module 2, are associated with motor drives that in turn provide drive signals to motors. The motor drives exchange speed control data with the industrial controller 15 through the optimized connection packet 100. An exemplary data structure for the data elements of the speed control data is provided below in Tables 1 and 2. Table 1 provides format information for each of the speed control data elements, and Table 2 illustrates how data objects in the I/O module 30 are assembled into a data block for inclusion in the optimized connection packet 100. In the case of the scanner 55, the data objects (e.g., representing buffers in the I/O module) are concatenated by the scanner 55 into a single I/O data block for the I/O module 35.

The data objects of the I/O module 30 represent the configuration and state of the I/O module 30. The data blocks for all of the I/O modules 30, 35 are concatenated to form the optimized connection packet 100. The data structure and data block format are provided for illustrative purposes only, and the application of the present invention is not limited to any particular data structure or format.

TABLE 1

Data Structure

Separated Module Template
Struct Speed Control
BOOL AtSpeed
BOOL RefFromNet
BOOL ControlFromNet BOOL Ready
BOOL Running Reverse BOOL RunningForward BOOL pad
BOOL Faulted
INT8 pad
INT16 SpeedActualRPM

TABLE 2

Data Block Organization

| Byte | Bit 7 | Bit 6 | Bit 5 | Bit 4 | Bit 3 | Bit 2 | Bit 1 | Bit 0 |
|---|---|---|---|---|---|---|---|---|
| 0 | At Speed | Ref- From Net | Ctrl From Net- | Ready | Running Reverse | Running Forward | | Faulted |
| 1 | Pad Byte | | | | | | | |
| 2 | Speed Actual RPM (Low Byte) | | | | | | | |
| 3 | Speed Actual RPM (High Byte) | | | | | | | |

As seen in Table 1, the speed control data includes Boolean flags indicating whether the motor is running at the desired speed (AtSpeed); whether the torque reference is provided locally or over the network (Ref From Net); whether the motor drive is controlled locally or over the network (ControlFromNet); whether the motor drive is in a ready state (Ready); whether the motor is running in a reverse (Running Reverse) or forward (RunningForward) direction; and whether the motor drive is in a fault state (Faulted). One flag (pad) is reserved for future use. The speed control data also includes a reserved, 1 byte field (pad), one byte for the least significant bits of the motor speed (SpeedActualRPM), and one bye for the most significant bits of the motor speed. The speed control data for the two modules is simply concatenated within the optimized connection packet 100 resulting in a string of bits including the speed control data described above for each module. Hence, each data object for an I/O module is arbitrarily offset within the optimized connection packet 100, albeit in a predetermined manner.

Assuming the optimized connection packet 100 starts with the data for module 1 followed by data from other modules, and then by the data for module 2, bits 0 through 31 (i.e., block 115) represent the module 1 speed control data and bits 628 through 659 (i.e., block 120) represent the speed control data for module 2.

Although only one data block 115, 120 is shown for each I/O module 30, multiple data blocks may be used. For example, the output data, or configuration data for an I/O module 30 may be included in a separate block from the input data. Also, the input data may be separated into separate data blocks, each associated with one of the buffers on the I/O module 30.

The industrial control system 10 employs cast tags 125 that reference individual blocks 115, 120 within the optimized connection packet 100. Generally, a cast tag 125 provides a logical reference to a portion of the optimized connection packet 100 that includes the data objects for a particular I/O module 30. Control programs 130 in the industrial controller 15 may use the cast tags 125 in lieu of a hard reference to the individual bits of the optimized connection packet 100.

In a typical industrial control environment, a tag may be used to reference a single data area. A tag typically includes a name or symbol, a data type that specifies member names and data format, and a data object that references a particular physical location of a data set. The data object for a conventional tag represents the entire data set, and typically only one tag references a particular data object.

A cast tag 125 differs from a conventional tag in that its data object only references a subset of the data set, and its data type is superimposed over the portion of the data set it references. Multiple cast tags 125 can reference different subsets of the data set for different I/O modules 30 and impose their own independent data types over that data. In the programming view, the tags appear to be independent. Hence, each cast tag 125 references the I/O data of one of the I/O modules 30, and the members defined by the cast tag 125 reference the individual data elements stored in the buffer(s) of the I/O module 30.

The structure represented in Table 1 above represents the data type used in the cast tag 125 for specifying the members and data formats for the data elements of the speed control data. Hence, in the cast tag 125 Module1.AtSpeed, Module 1 is the symbol and AtSpeed is defined as one of the members of the data type with a Boolean format. The data object references Bit 7 of the optimized connection packet 100.

The following pseudocode examples provided below in Tables 3 and 4 illustrate how the programmatic references using a cast tag 125 differ from previous hard reference commands. The pseudocode is not intended to reflect the actual code that is used, but rather to conceptually illustrate the advantage provided by cast tags 125 over hard references.

TABLE 3

Pseudocode Using Cast Tags

If NOT( Module1.AtSpeed )
Alert ( 17 );
While( Module2.SpeedActualRPM < 30000)

TABLE 4

Pseudocode Without Cast Tags

If NOT(Bit[7] of OCP)
Alert ( 17 );
While(Bits[643 . . . 648] of OCP < 30000)

As is apparent in the example of Table 3, the cast tags 125 allow reference to the parameters of the associated module 30 without requiring knowledge of the order used by the scanner 50 to concatenate data. Moreover, the data format is specified in the cast tag 125 and need not be included in the programmatic reference.

Returning to FIG. 1, the cast tags 125 are instantiated and maintained by the programming terminal 20 and may be used in the programming environment to generate the control program of the industrial controller 15. In the programming environment, the data for each module 30 appears to be independent, and each member can be referenced by name in the logic. The cast tags 125 are also stored on the industrial controller 15.

In some cases, the control program may be compiled prior to loading it on the industrial controller 15, and the references are translated into physical references in the compiled code. However, if the organization of the optimized connection packet 100 used by the scanner 50 changes (e.g., due to the addition or deletion of a module 30), only the cast tags 125 need to be updated. The control program may then be re-compiled and the new references specified by the cast tags 125 will be incorporated into the compiled code. Hence, no changes are required in the control program. In other cases, where the control program is interpreted, the cast tags 125 may be referenced directly in the control program. Because the industrial controller 15 stores the cast tags 125, other entities in the industrial control system 10 may also use the logical references created by the cast tags 125 to reference module data stored by the industrial controller 15. For example, the HMI 25 may query the industrial controller 15 to determine if the motor associated with Module 1 is at speed using the Module1.AtSpeed reference. Moreover, the HMI 25 may include its own code operable to continually display the status of the motors associated with Modules 1 and 2 on its display. The HMI code need only use the Module1.AtSpeed and Module2.AtSpeed reference to access the status information. If the organization of the optimized connection packet 100 changes, the HMI 25 code does not need to be modified.

The cast tags 125 may also be used to reconstruct the control program. For example, if a programming terminal other than the programming terminal 20 shown in FIG. 1 (e.g., a field programming terminal implemented on a notebook computer) interfaces with the industrial controller 15, it may use the cast tags 125 to determine the construction of the optimized connection packet 100 and also to analyze the control program code.

The use of cast tags 125 greatly simplifies the development and maintenance of code used in the industrial control system 10. Changes to the organization of the optimized connection packet 100 do not require code modifications, only updates to the cast tags 125. Moreover, once cast tags 125 are defined, users may interface with the industrial control system 10 with greater ease, as they do not need to access an external document that described the mapping of the optimized connection packet 100 to access module data in the industrial control system 10.

Figure 3:
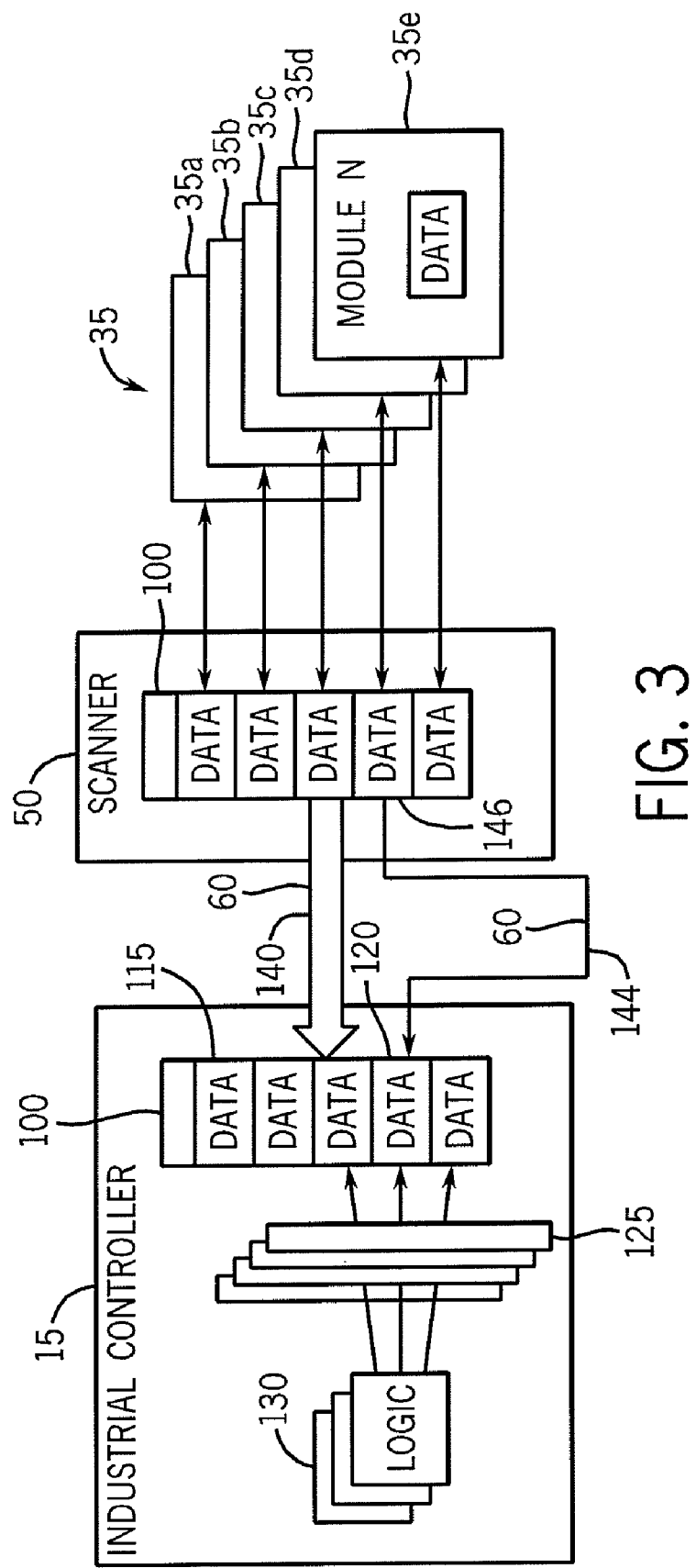
FIG. 3 is a diagram similar to that of FIG. 2 showing the opening of a second connection between the industrial controller and the scanner for transmitting a subset of the optimized control packet.

Referring now to FIG. 3, as described above, the connection 140 on network 60 follows a given schedule for the transmission of the optimized connection packet 100 to the industrial controller 15 (and a similar schedule for a return packet from the industrial controller 15 to the scanner 50). This schedule ensures that undetected network congestion does not occur to unpredictably delay the update interval for the data of the optimized connection packet 100 as is necessary for certainty in industrial control where excessive or unpredictable delay of data can have adverse effects on the controlled process.

The actual demand for the data of different I/O modules 35 may vary, for example, with the data of I/O modules 35*a*, 35*b* 35*c* and 35*e* requiring only a relatively low update rate because they are associated with sensors having either non-critical or slowly-changing data, and the data 146 of I/O module 35*d* requiring a relatively high-update rate because it is associated with a high-speed sensor or a critical time-sensitive data. The high-update rate of the data 146 of I/O module 35*d* may be accommodated by increasing the frequency of transmission of the optimized connection packet 100 to the industrial controller 15, but at the cost of requiring excessive bandwidth of the networks 60.

Figure 4:
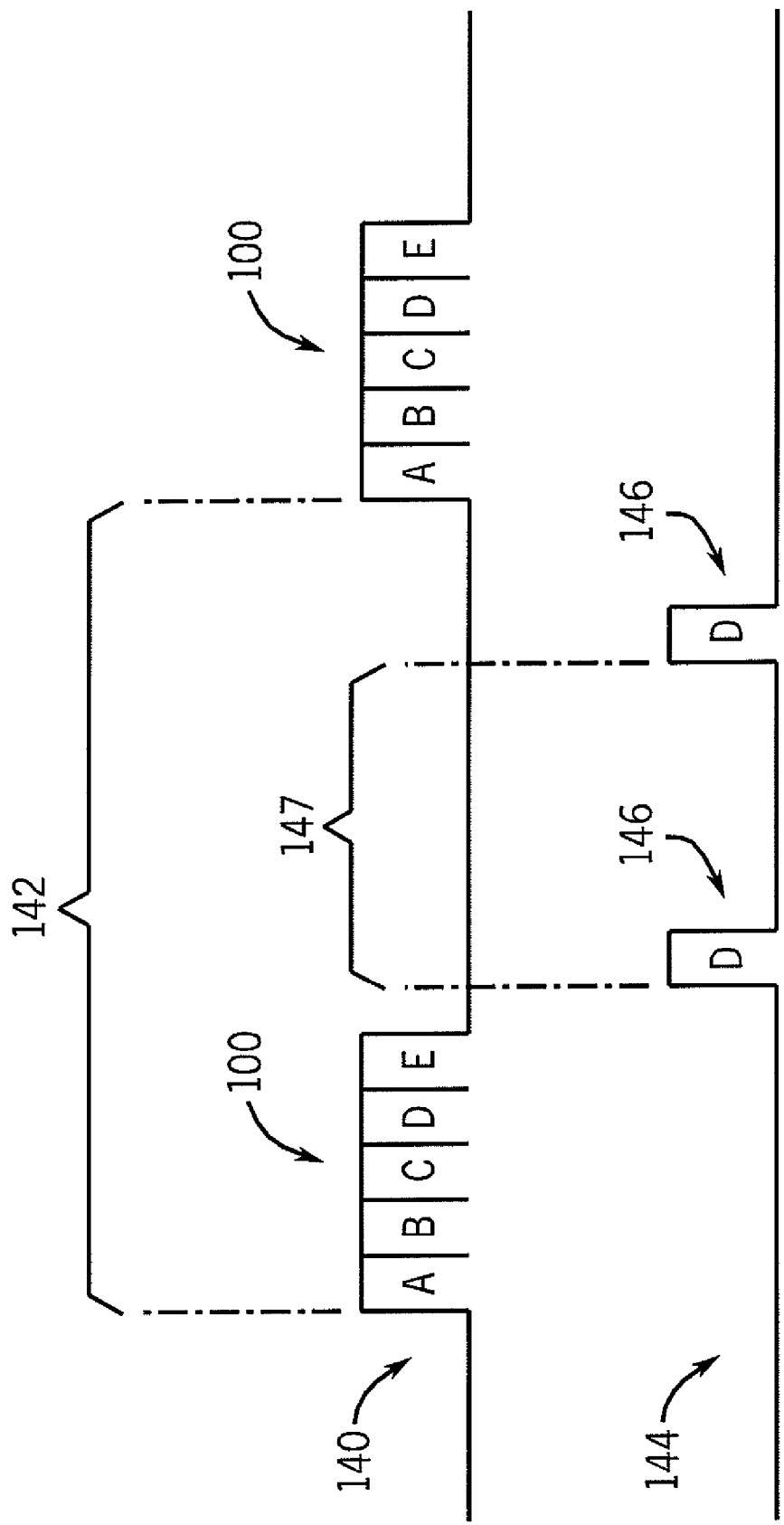
FIG. 4 is a timing diagram showing the interleaving of transmission of the optimized connection packet and a subset of the optimized connection packet, such as provides for variability in data transmission rates.
Figure 5:
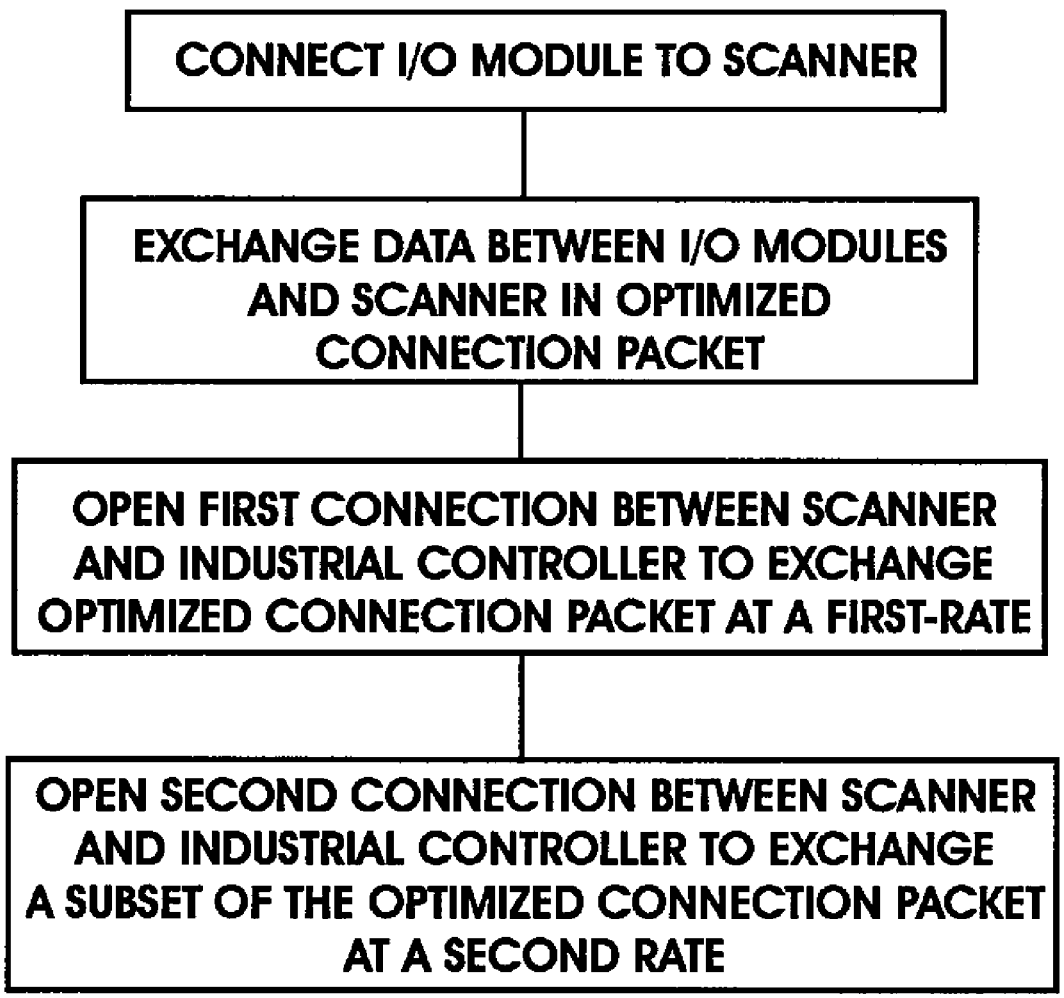
FIG. 5 is a flow chart showing the principal steps of the present invention.

Referring now also to FIG. 4, this update interval 142 of the connection 140 may therefore, in the present invention, be set to a value that is suitable for the data of I/O modules 35*a*, 35*b*, 35*c* and 35*e* and yet is insufficiently fast for the data 146 of I/O module 35*d*, which, for example, may require one third the update interval of that for the data of I/O modules 35*a*, 35*b*, 35*c* and 35*e*. By increasing the interval 142 to an amount greater than would be required for the data 146 of I/O module 35*d*, considerable bandwidth on the networks 60 is freed as well as processing time for responding to the receipt of data.

Referring to FIG. 3, the present invention allows the update frequency of the entire optimized connection packet 100 to be moderated by opening a second connection 144 just for the data 146 of I/O module 35*d* that requires a higher update rate. This second connection 144, like connection 140, reserves bandwidth and other resources on the networks 60 to ensure reliable transmission of the data 146 of I/O module 35*d* but, unlike a standard connection, does not reserve separate buffers to hold the transmitted data, but employs the identical buffers in the scanner 50 and in the industrial controller 15, already reserved for the optimized connection packet 100 of I/O modules 35*a*, 35*b*, 35*c*, 35*d*, and 35*e*.

Thus, it will be understood from FIG. 3, that the data for I/O module 35*d* is not eliminated from the optimized connection packet 100 and therefore already has buffer space reserved from connection 140. By employing the identical buffer space of connection 140 for connection 144, the problems presented by possibly different values of data 146 of I/O module 35*d* in different buffers associated with different connections 140 and 144 are eliminated. It will be understood that different values of the same data in different locations can cause unpredictable operation of the control program 130 depending on which location is read by the control program 130.

Referring to FIGS. 3 and 4, the connection 144 is similar to that of 140 except that connection 144 transmits only the data 146 of I/O module 35*d* (being a subset of the optimized connection packet 100) and has a shorter update interval 147.

With connections 144, the data 146 of I/O module 35*d* is sent over two connections, first over connection 140 as part of the optimized connection packet 100 and then sent twice more within interval 147 as part of connection 144. The spacing of the transmission of the data 146 in connections 140 and 144 may but need not be such as to provide a substantially uniform time separation in the receipt of data 146 so that the timeliness of the data is maximized.

It will be understood that as little as a single intervening transmission of data 146 may be provided between transmissions of the optimized connection packets 100 or as many as may be fit within the interval 142. Further, additional connections (not shown) may be opened to provide for the transmission of other data elements for particular modules 35 having a different updating interval or that data from multiple I/O modules may be transmitted on the given connection 144.

Significantly, because the data, for example, data 146 is transmitted in the optimized connection packet 100, the present invention lends itself to situations where only after configuration of the I/O modules 35 and the formation of the optimized connection packet 100, it is realized that a higher data rate is required for one subset of the I/O modules 35. In this case, an additional connection 144 is opened without changing the connection 140, previously used to forward the optimized connection packets 100, for example, for I/O module 35*d*. Significantly, the additional connection 144 may be opened without closing the connection 140, allowing this upgrading to occur while the industrial control system 10 is operating without interruption of the connection 140 at any time. Because identical buffers are used for connections 144 and 140, there is no danger of lack of buffer space being a problem.

It will be understood that the use of a separate connection 144 does not affect adversely the cast tags described above which still refer to the same locations in the buffers of industrial controller 15 and further, that the interval 147 may be freely changed again without upsetting the fundamental connection used to transmit the optimized connection packet 100.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

We claim:

1. An industrial control system comprising:
   a plurality of Input/Output (I/O) modules operable to interface with a process to exchange I/O data with the process;
   a scanner operable to exchange the I/O data with the I/O modules and create an optimized connection packet including the I/O data for each I/O module arranged in an unformatted data block;
   an industrial controller operable to exchange the optimized connection packet with the scanner in a first connected message at a first rate at first times, wherein the first connected message pre-allocates network bandwidth and buffer space, and to exchange a subset of the optimized connection packet with the scanner at a second rate in a second connected message at second times interleaved with the first times wherein the first connected message stores the I/O data contained within the optimized connection packet in a buffer and the second connected message stores the I/O data contained within the subset of the optimized connection packet in the same locations of the buffer as the I/O data from the first connected message; and
   wherein the I/O data contained within the subset of the optimized connection packet is delivered more frequently than I/O data of the optimized connection packet other than the subset of the optimized connection packet.

2. The industrial control system of claim 1 wherein the subset of the optimized connection packet is defined by the I/O data of given I/O modules.

3. The industrial control system of claim 1 wherein the second rate is equal to the first rate whereby the I/O data of the subset of the optimized connection packet is delivered twice as fast as other I/O data of the optimized connection packet.

4. The industrial control system of claim 1 wherein the first times are equally spaced between the second times.

5. The industrial control system of claim 1 wherein the second rate is greater than the first rate whereby the subset of the optimized connection packet is delivered twice as fast as the I/O data of the optimized connection packet other than the subset of the optimized connection packet.

6. The industrial control system of claim 1 wherein the scanner builds the optimized connection packet in a scanner buffer and wherein the first and second connected messages use the scanner buffer for corresponding data.

7. The industrial control system of claim 1 wherein the scanner communicates with the plurality of I/O modules at a plurality of different times.

8. A method of operating an industrial control system comprising the steps of:
   (a) connecting a plurality of I/O modules to a scanner, the I/O modules operable to interface with a process to exchange I/O data with the process;
   (b) exchanging I/O data between the I/O modules and the scanner to create in the scanner an optimized connection packet including the I/O data for each I/O module arranged in an unformatted data block;
   (c) opening a first connection between the scanner and an industrial controller to exchange the optimized connection packet with the industrial controller in a first connected message at a first rate at first times, wherein the first connected message pre-allocates network bandwidth and buffer space;
   (d) storing the I/O data contained within the optimized connection packet in a buffer;
   (e) opening a second connection between the scanner and the industrial controller to exchange a subset of the optimized connection packet with the industrial controller in a second connected message at a second rate at second times interleaved with the first times; and
   (f) storing the I/O data contained within the subset of the optimized connection packet in the same locations of the buffer as the I/O data from the first connected message,
   wherein the I/O data contained within the subset of the optimized connection packet is delivered more frequently than I/O data of the optimized connection packet other than the subset of the optimized connection packet.

9. The method of claim 8 wherein the second connection is opened at a time after a period of operation of the industrial controller.

10. The method of claim 8 wherein the subset of the optimized connection packet is defined by the I/O data of given I/O modules.

11. The method of claim 8 wherein the second rate is equal to the first rate whereby the I/O data of the subset of the optimized connection packet is delivered twice as fast as other I/O data of the optimized connection packet.

12. The method of claim 8 wherein the first times are equally spaced between the second times.

13. The method of claim 8 wherein the second rate is greater than the first rate whereby the subset of the optimized connection packet is delivered twice as fast as other I/O data of the optimized connection packet.

14. The method of claim 8 wherein the scanner builds the optimized connection packet in a scanner buffer and wherein first and second connections use the scanner buffer for corresponding data.

15. The method of claim 8 wherein the scanner communicates with the plurality of I/O modules at a plurality of different times.

16. A computer program stored in a computer memory for operating an industrial control system having a plurality of I/O modules connected to a scanner, the I/O modules operable to interface with a process to exchange I/O data with the process; the scanner operable to collect I/O data exchanged between the I/O modules and the scanner into an optimized connection packet including the I/O data for each I/O module arranged in an unformatted data block, the computer program executing to:
   (i) open a first connection between the scanner and an industrial controller to exchange the optimized connection packet with the industrial controller in a first connected message at a first rate at first times, wherein the first connected message pre-allocates network bandwidth and buffer space;
   (ii) store the I/O data contained within the optimized connection packet in a buffer;
   (iii) open a second connection between the scanner and the industrial controller to exchange a subset of the optimized connection packet with the industrial controller in a second connected message at a second rate at second times interleaved with the first times; and
   (iv) store the I/O data contained within the subset of the optimized connection packet in the same locations of the buffer as the I/O data from the first connected message,
   wherein the I/O data contained within the subset of the optimized connection packet is delivered more frequently than I/O data of the optimized connection packet other than the subset of the optimized connection packet.

* * * * *